United States Patent Office 2,884,401
Patented Apr. 28, 1959

2,884,401

RUBBERY MATERIAL COMPRISING CERTAIN CROSS-LINKED SOFT POLYTHIOUREA HIGH POLYMERS AND PROCESS OF MAKING SAME

George L. Wesp, Englewood, Ohio, assignor to Monsanto Chemical Company, St. Louis, Mo., a corporation of Delaware No Drawing. Application April 9, 1954
Serial No. 422,256

17 Claims. (Cl. 260—37)

This invention relates to a new type of synthetic rubber having high resistance to the action of organic solvents. In certain aspects the invention pertains to a method of curing a certain type of polythiourea high polymer which in the uncured state exhibits cold flow at room temperature but which in the cured state has a rubbery nature and is very resistant to the action of organic solvents. In still other aspects the invention relates to a synthetic material which has rubbery properties, high solvent resistance, and exceptional response to the reinforcement action of carbon black to give good strength characteristics.

Polythiourea high polymers have long been known. They are conveniently prepared by a number of methods, perhaps the simplest being the reaction of a diamine with carbon disulfide; a condensation polymerization is effected wherein hydrogen sulfide is eliminated, and the resulting high polymer is called a polythiourea. Various other procedures are available for making polythioureas, such as by reaction of an ester of trithiocarbonic acid and a polyamine, reaction of a polyamine with a bis(dithiocarbamate), reaction of a diamine with ammonium thiocyanate, and reaction of a polyamine with a polyisothiocyanate. See U.S. Patent 2,313,871 for further details. The type of diamine and resultant recurring unit in the polythiourea is subject to almost infinite variation. Most polythiourea polymers are of comparatively high melting point, e.g., above 50 or 100° C., and usually above 150° C. The properties of a polythiourea are dependent on the initial reactants and on the extent of polymerization. The most favored type of diamine reactant is the alkylene diamine, e.g., hexamethylene diamine (1,6-diamino-n-hexane), but all sorts of other diamines having straight chain, branched chain, or cyclic structures and consisting of carbon and hydrogen or also including hetero-atoms, have also been mentioned as reactants for use in making polythioureas. Principal interest, however, has been in those reactants and reaction conditions which give high melting point fiber-forming polymers.

The essence of the present invention lies in making a rubbery polythiourea, having extraordinary solvent resistance, and further having good response to reinforcement by carbon black. I have found that a polythiourea which exists as a soft and weak plastic having little or no elasticity, which has a second order transition temperature below room temperature (20° C.), and which cold flows at room temperature, when cross-linked is converted into a new type of synthetic rubber which is very resistant to the action of organic solvents. When carbon black is incorporated into the polythiourea along with the cross linking agent, e.g., formaldehyde, and the reaction then effected by heating, the resulting material has good strength and elongation properties as well as high solvent resistance.

The polythiourea employed must be a high polymer which, however, prior to cross-linking has a second order transition temperature below room temperature and exhibits cold flow at room temperature, and thus is not of the usual high melting point type, and its main chain must comprise recurring units of a chain of at least 7 atoms, the majority of which and the terminal members of which are carbon, and at least one of which is oxygen, sulfur or nitrogen, said chain of at least 7 atoms joining the nitrogen atoms of adjacent thiourea residues. These polythioureas can be represented by the following type formula, in which the chain of at least 7 carbon atoms the majority of which and the terminal members of which are carbon and at least one of which is oxygen, sulfur or nitrogen is represented by the line designated as "chain":

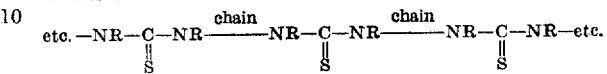

In the foregoing formula, R preferably represents hydrogen or less preferably a monovalent hydrocarbon radical, especially alkyl. Of the hetero-atoms oxygen, sulfur and nitrogen, the preferred one is oxygen. Particularly suitable polythioureas are those containing a chain of from 7 to 12 atoms between nitrogen atoms of adjacent thiourea residues, which chain also contains one or two oxygen atoms. Where a plurality of hetero-atoms is present, they should be separated from each other by at least one and preferably two or more carbon atoms. The chain of at least 7 atoms joining adjacent thiourea residues can be an unbranched chain, or can have substituents branched off from the atoms composing the chain. It is required, however, that there be a chain of at least 7 atoms, including the other restrictions hereinabove described, between nitrogen atoms of the adjacent thiourea residues, and that the terminal members of such chain be carbon atoms.

As indicated, the polythioureas must be high polymers. A convenient way to determine qualitatively the extent of polymerization is to measure the viscosity of a solution of the polymer. It is preferred that the polythioureas which, in accordance with this invention, are reacted with formaldehyde, have a specific viscosity of at least 0.1 as measured on a solution of 1 weight percent of the polythiourea dissolved in dimethylformamide, the viscosity measurement being made at 25° C.

Those skilled in the art, having had the benefit of the present disclosure, will understand various types of reactants and reaction procedures available for making polythioureas having the limitations herein described. As a matter of convenience, and referring to a preferred class of reactants, the discussion given hereinafter will be principally concerned with the reaction of a diamine with carbon disulfide. However, the various other types of reactants known to give polythioureas, for example as described in the aforementioned U.S. Patent 2,313,871 and elsewhere in the art, can also be used with suitable modification which will be understood by those skilled in the art.

The preparation of a polythiourea from carbon disulfide and a diamine generally involves reacting carbon disulfide with a diamine having the formula

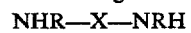

wherein R is hydrogen or a monovalent hydrocarbon radical, preferably hydrogen or if a hydrocarbon radical preferably a lower alkyl group and where the R's can be the same or different in the diamine, and wherein X comprises a chain of at least 7 atoms the majority of which and the terminal members of which are carbon atoms and which chain contains at least one hetero-atom selected from the group consisting of oxygen, sulfur and nitrogen. In theory, equimolar quantities of carbon disulfide and diamine react. It is preferred to charge an excess of carbon disulfide over the stoichiometric quantity, in order to obtain more efficient reaction; unreacted carbon disulfide is later removed, as by vaporization from the polymeric material. The reaction is conveniently effected in a solvent, e. g., methanol, phenol, water, benzene. After initial reaction of carbon disulfide with diamine, the resulting material is heated to a temperature which can suitably be within the range of 100 to 200° C., until the condensation polymerization has continued to the desired extent. The reaction liberates hydrogen sulfide, which is preferably continuously removed. The reaction period will ordinarily be at least one hour, and frequently will be within the range of 2 to 6 hours. To a certain extent the reaction time is inversely proportional to the temperature. It is often convenient to carry out the reaction at two or more different temperature levels, first using a comparatively low temperature and later increasing the temperature to obtain the final stages of polymerization.

By way of example, and not limitation, of suitable primary and secondary diamines useful in preparing polythioureas to be used in the practice of the invention, can be mentioned:

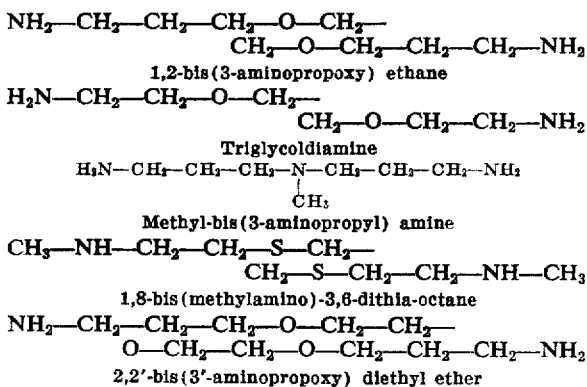

It will be seen that all of the foregoing compounds meet the requirements as stated herein. Of course, those skilled in the art will understand that the diamines should not contain groups which under the conditions employed for the formation of the polythiourea high polymer, are reactive with the diamines themselves or the carbon disulfide. Also, those skilled in the art will understand that when the polythioureas are to be prepared from a diamine and a reactant other than carbon disulfide, e.g., a bis(dithiocarbamate) or a diisothiocyanate, the other reactants should conform to the requirements stated herein such that the polythiourea high polymer has the structure and properties already set forth, i.e., such that there is formed a polythiourea high polymer having a second order transition temperature below 20° C. and containing recurring units in the polymer chain having the formula

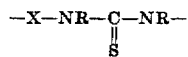

wherein R and X are as defined hereinabove. It will be apparent that where a single diamine and carbon disulfide are the reactants, each recurring unit in the polythiourea molecule will be the same. However, where a mixture of diamines is reacted with carbon disulfide, or where a diamine and another compound such as a diisothiocyanate are reacted, the polythiourea high polymer may contain recurring units that differ from each other within the same molecule, depending on the starting materials.

Having formed a polythiourea high polymer of the desired characteristics, the same is then cross-linked or "cured." A variety of cross-linking agents are suitable for this purpose. Naturally, the optimum amount of cross-linking agent to be used with a particular polythiourea will be dependent upon the agent chosen. In most instances, less than 5 parts by weight cross-linking agent per 100 parts by weight polythiourea are used. The cross-linking agent changes the soft polythiourea to a strong, rubbery material, by chemical interaction wherein cross-links are formed by attachment of a molecule of the cross-linking agent to two different polythiourea molecules; this occurs by linking at nitrogen atoms of the polythiourea and possibly also at sulfur atoms of the polythiourea. Those skilled in the art are fully familiar with the principles of cross-linking and, with the disclosure given herein, will understand how the cross-linking is effected. One group of cross-linking agents that is particularly preferred constitutes those compounds containing reactive methylol groups; by this is meant those compounds which on heating with another compound containing methylol or amino groups will combine with such methylol or amino groups with splitting out of water. Trimethylol melamine is a preferred cross-linking or curing agent to be employed in the practice of the present invention. This material is readily incorporated with the polythiourea of the type described herein by milling or other conventional procedures, with little danger of an initial cure appearing on the mill rolls. On subsequent heating, for example to temperatures of 100 to 200° C., cross-linking reactions readily occur resulting in the production of a strong rubbery cross-linked polythiourea having very high resistance to solvent action. Other examples of compounds containing reactive methylol groups are dimethylolyl urea, dimethylol methylene-bis-stearamide, melamine-formaldehyde and urea-formaldehyde resins containing reactive methylol groups.

Another group of suitable cross-linking agents is made up of formaldehyde and formaldehyde-liberating substances. Paraformaldehyde is the most convenient and effective form of formaldehyde to use. It will be understood that when reaction of formaldehyde is mentioned herein, there is included the use not only of formaldehyde per se but of paraformaldehyde, trioxane, and other polymeric forms of formaldehyde which readily liberate formaldehyde, and for that matter other formaldehyde-liberating substances. However, all such materials are by no means equivalents. Thus, paraformaldehyde is far more effective than the same weight of trioxane. While up to 3 parts by weight formaldehyde, or its equivalent of other compounds of the type described, can be employed per 100 parts by weight of the polythiourea, it is usually found that best results are obtained when using from 1 to 2 percent formaldehyde. (The word "percent" as used herein refers to weight percent formaldehyde or other cross-linking agent based on weight of the polythiourea, or in other words, parts cross-linking agents by weight per 100 parts by weight polythiourea.) Among other cross-linking agents that can be used are aliphatic dialdehydes, such as glyoxal. Epichlorohydrin is also an effective cross-linking agent to convert the soft polythiourea into a solid rubbery material having a high resistance to organic solvents. Lead oxide, e.g., $Pb_3O_4$, can be used as cross-linking agent. Other cross-linking agents include the polyisocyanates, especially the diisocyanates, e.g., meta-tolylene diisocyanate, naphthalene diisocyanate, and the like.

Only a small amount of cross-linking agent is needed to effect the conversion of the soft polythiourea to the tough rubbery polythiourea. It will be understood that the curing agents mentioned cannot at all be considered to be full equivalents of each other, for the results obtainable will differ considerably depending on the particular agent employed, as well as depending upon the particular polythiourea employed. Those skilled in the art, having had the benefit of the present disclosure, can determine the amount of particular curing agent to use in any given situation by simple tests, the nature of which will be obvious from the discussion and data given herein.

A convenient procedure for incorporating cross-linking agent with the polythiourea is to admix same intimately on mill rolls. The practicality of doing this will of course be dependent upon the characteristics of the polythiourea in question. It is preferred to use sufficiently small batches to minimize heating on the rolls, as such heating tends to start the "curing" reaction on the rolls themselves, which is usually objectionable. If the polythiourea cannot be readily milled in its uncured state, because of tackiness or other physical characteristics, the formaldehyde or other curing agent can be incorporated therewith by other methods, such as by dissolving in a common solvent with subsequent removal of the solvent.

Often, the mixture of curing agent, such as trimethylol melamine, and polythiourea is heated in a mold so as to give a final product having the desired shape. Various other suitable handling techniques will be apparent to those skilled in the art. Thus, the mold can have a specific shape in case a particular object is desired, or flat heated platens can be used to form a sheet of any desired thickness.

In a preferred modification of the invention, a finely divided rubber reinforcement agent, especially carbon black, is intimately dispersed in the polythiourea prior to its reaction with the trimethylol melamine, paraformaldehyde, or other curing agent. Such dispersion can, for example, be effected by incorporation of the carbon black into the polythiourea on conventional rubber mill rolls, with simultaneous or preferably subsequent incorporation of the curing agent. Furnace, channel, or acetylene blacks are all suitable, although of course the properties of the final product will be greatly dependent upon the particular black chosen as well as upon other factors. The furnace blacks are preferred in many instances. Of particular interest are the semi-reinforcing blacks (SRF), such as "Furnex," the high abrasion furnace blacks (HAF), such as "Philblack" A and O and "Statex-R," and the super-abrasion furnace blacks (SAF), such as "Vulcan-9." Black loading will naturally be dependent upon the properties desired in the final product, but in general will be within the range of 10 to 70 p.h.r. and preferably 20 to 50 p.h.r. (parts carbon black by weight per 100 parts polythiourea resin by weight). The response of the polythioureas of the type described herein to carbon black is remarkable. It is believed that the present invention provides a fundamentally new type of synthetic, truly rubbery material, having high solvent resistance and having excellent response to the incorporation of carbon black. This can be contrasted with the action of carbon black in certain other types of rubbery high polymers. For example, the Vulcollan type of synthetic rubbers do not respond to the addition of carbon black. By respond it is meant that the carbon black reinforces the rubber and gives it greatly enhanced strength and tensile properties.

In addition to or instead of carbon black, other typical rubber reinforcing agents can be employed, e.g., finely divided silicas, clays, and the like.

In the practice of the present invention, many modifications can be made. Thus, fillers, pigments, other polymers, natural and synthetic resins, plasticizers, fibers, dyes can be incorporated into the finished product, preferably by admixture with the polythiourea prior to its reaction with the curing agent, or alternatively or additionally by intimate admixture into the "cured" product.

In order to illustrate some aspects of the invention, the following examples are presented. It will be understood that the invention in its broadest scope is not limited by the particular materials, quantities and conditions used in these examples.

EXAMPLE 1

A solution of 0.60 mol of 1,2-bis(3′-aminopropoxy) ethane in 300 ml. methanol was cooled to 2.5° C. and treated with excess (2.0 mols) carbon disulfide during about 17 minutes. An exothermic temperature rise to 17° C. was noted when about one-third of the carbon disulfide had been added. The resulting clear but two phase liquid was distilled with oil bath heating to remove methanol, and the clear oily residue then warmed under nitrogen during 3 hours to 155° C. The material was then held at 155–160° C. for 1.75 hours, during which time evolution of hydrogen sulfide ceased.

The resulting polythiourea resinous material was a soft semi-solid and exhibited cold flow at room temperature. The weight was 131.1 grams, corresponding to a 100 percent yield of the resin containing the repeat unit

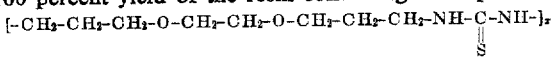

This clear amber resin could be reshaped and kneaded in the fingers at room temperature, drawn out to taffy-like fibers. Its specific viscosity (1% in dimethylformamide) was 0.219. A portion of the polythiourea high polymer just described, weighing 21.7 grams was heated further under nitrogen for 3 hours at 200–205° C. resulting in a weight loss of only 0.25 gram. This showed that the 155–160° C. finishing temperature used on the bulk of the material caused nearly complete reaction. The reheating at 200–205° C. increased the stiffness of the material but did not change it from a semi-solid.

Further discussion in this example refers to the polythiourea prepared at a final temperature of 155–160° C. as described above, and not to the material reheated at 200° C.

A small portion of the polythiourea resin, when melted and flooded with aqueous formaldehyde on a 150° C. surface, set up to a rubbery material which was no longer soluble in dimethyl formamide.

Paraformaldehyde and, where used, "Kosmobile 77" channel carbon black, were incorporated in the polythiourea resin by masticating and mixing on a rubber mill with the rolls at or only slightly above room temperature, using heat of mixing to keep the stock mobile. The resulting admixtures were press-cured, forming molded specimens for physical tests, which tests were made by standard testing procedures. The heated molds were provided with chrome plate surfaces, against which "Teflon" sheet inner liners were used to prevent sticking of the specimens to the metal surfaces of the plates. The test data are presented in Table I.

*Table I*

| Sample | PF [1] | K-77 [2] | Cure °C. | Cure Minutes | Tensile Strength, p.s.i. Break | Tensile Strength, p.s.i. 300% Elong. | Elong., Percent | Clash-Berg, °C. $T_f$ | Clash-Berg, °C. $T_{2100}$ | Clash-Berg, °C. SR | Clash-Berg, °C. Modulus, 25° C. | Shore A Hardness, 15 sec. | Remarks |
|---|---|---|---|---|---|---|---|---|---|---|---|---|---|
| 1 | 10 | | 160 | 10 | | | 245 | Not Tested, Overcure | −10.6 | 2.5 | 13.1 | | 60 | Soft, rubbery, tears easily. |
| 2 | 5 | | 160 | 5 | 240 | | | −7.5 | 6.5 | 14.0 | | 45 | Do. |
| 3 | 2.5 | | 160 | 10 | 210 | 125 | 490 | | | | | 31 | Soft, rubbery, tears easily, but some tear resistance. |
| 4 | 2.5 | | 160 | 10 | 310 | 125 | 635 | −6.9 | 8.1 | 15.0 | | 33 | |
| 5 | 2.5 | | 176 | 10 | 205 | 95 | 760 | −6.9 | 7.3 | 14.2 | | 31 | |
| 6 | 2.5 | 30 | 160 | 10 | 435 | 405 | 330 | −3.8 | 9.7 | 13.5 | | 50 | |
| 7 | 2.5 | 50 | 160 | 10 | 1,810 | 870 | 410 | 1.3 | 14.9 | 13.6 | 860 | 57 | Tensile test failed in jaws so tensile values probably too low. |
| 8 [3] | 2.5 | 50 | 177 | 5 | 2,220 | 780 | 540 | −1.0 | 15.5 | 16.5 | 1,120 | 57 | |

[1] Paraformaldehyde, parts per 100 parts polythiourea.
[2] Kosmobile No. 77, parts per 100 parts polythiourea.
[3] Clash-Berg specimen cured 20 minutes.

It will be noted that 10 parts paraformaldehyde per 100 parts polythiourea (sample 1) was entirely unsatisfactory. Five parts paraformaldehyde (sample 2) was also too much for good results. Comparison of samples 3–5 and samples 6–8 shows the excellent response of the paraformaldehdye-polythiourea rubber to the incorporation of carbon black. The best sample, No. 8, showed a breaking strength of 2200 p.s.i. at 540 percent elongation. Further, the 300 percent modulus was 780 p.s.i. These properties are those of an excellent rubber.

A second portion of Sample No. 8 was prepared in the identical manner as that on which the strength properties given in Table I were determined, with the exception that the milling time was slightly shorter. This second portion was used for the Clash-Berg data given in Table I, and for solvent resistance tests. The polythiourea, cured 5 minutes at 177° C. with 2.5 p.h.r. paraformaldehyde and 50 p.h.r. Kosmobile 77 carbon black, i.e., the second portion of sample 8, was subjected, in three separate tests, to the action of various solvents for 72 hours at 100° C. The rubber sample was merely suspended in the solvent and the temperature was automatically maintained for the given period of time. Each rubber sample was weighed and its volume measured, both before and after the treatment with the solvent. Data are given in Table II.

*Table II*

SOLVENT RESISTANCE TESTS

[72 hrs. at 100° C.]

| Solvent | Percent Weight Increase | Percent Volume Increase |
|---|---|---|
| Xylene | 5.5 | 12.0 |
| Lubricating oil | −1.3 | 10.5 |
| Water | 8.0 | 12.5 |

This very severe test shows the rubber to have outstanding solvent resistance properties. The percentage increase in volume on heating in xylene at 100° C. for 72 hours, was far less than that suffered by any of a wide variety of commercial oil-resistant rubbers on treatment for 72 hours at or by room temperature and in a mixture containing only 50 percent toluene (balance heptane), as reported in J. Ind. Eng. Chem. 38, 964 (1946).

EXAMPLE 2

A polythiourea high polymer was prepared from the same reactants as given in Example 1, but the mol ratio of carbon disulfide to diamine charged to the reaction was 0.9. The condensation polymerization reaction was effected for a period of one and one-third hours at a temperature of 160° C. The resulting polythiourea had a specific viscosity (1% in dimethyl formamide) of 0.122 and thus, though a high polymer, was of much lower molecular weight than the polythiourea employed in Example 1.

In the manner described in Example 1, the polythiourea was intimately mixed with 2.0 parts by weight paraformaldehyde per 100 parts by weight polythiourea, and 50 parts by weight Kosmobile 77 carbon black. The admixture was heated at 176° C. for a period of 5 minutes. The tensile strength of the product was 1103 p.s.i. at an ultimate elongation of 250 percent. The Shore A 15-second hardness was 72. The Clash-Berg data gave $T_f$ of minus 21° C., $T_{2000}$ of plus 28° C., with a Stifflex range (SR) of 49. Comparison of these data with those given in Table I shows the results of lower molecular weight of the starting polythiourea. The low temperature flexibility characteristics ($T_f$) are much improved. However, this is at a sacrifice of strength and elongation.

EXAMPLE 3

By the methods generally described in Example 1, a polythiourea high polymer was made by heating 1.3 mols carbon disulfide with 1 mol of 2,2'-bis(3'-aminopropoxy) diethyl ether. This compound has the formula $NH_2CH_2CH_2CH_2OCH_2CH_2OCH_2CH_2OCH_2CH_2CH_2NH_2$ Reaction time for forming the polythiourea was 2.2 hours, at 155–160° C. The specific viscosity (1% in dimethylformamide) of the product was 0.218.

A number of compounding tests were made by the general procedures described in Example 1, using varying amounts of paraformaldehyde and carbon black. The data are given in Table III.

A portion of cross-linked sample c of Table III was subjected to solvent resistance tests in the same manner as the test described in Example 1 above, with the exception that contact with the solvent was for 60 hours at 90° C. The data are given at the bottom of Table III. Although no quantitative test was run to determine the resistance of the material to xylene, qualitative observations showed that its resistance to xylene was very high, and in general of the same order or even better than that shown in the tests given in Table II above.

*Table III*

| Sample | PF [1] | K-77 [2] | Cure ° C. | Cure Minutes | Tensile Strength, p.s.i. | 300% Modulus, p.s.i. | Elong., Percent | Clash-Berg $T_f$ | Clash-Berg $T_{2000}$ | Clash-Berg SR | Shore A Hardness, 15 sec. |
|---|---|---|---|---|---|---|---|---|---|---|---|
| a | 2.0 | 50 | 176 | 10 | 1,380 | 540 | 660 | | | | 57 |
|   |     |    |     |    | 1,440 | 450 | 800 | −37.4 | 7.7 | 45.1 |  |
| b | 2.5 | 50 | 176 | 10 | 1,790 | 1,100 | 400 | | | | 57 |
|   |     |    |     |    | 1,600 | 1,240 | 350 | | | | |
|   |     |    |     |    | 1,550 | 1,240 | 350 | | | | |
| c | 2.5 | 50 | 176 | 30 | 1,360 | 1,140 | 350 | | | | 63 |
| d | 3.0 | 50 | 176 | 10 | 1,250 | 900 | 360 | −41.4 | 6.3 | 47.7 | 65 |
|   |     |    |     |    | 1,290 | 940 | 340 | | | | |
| e | 4.0 | 50 | 176 | 10 | 615 |  | 200 | −22.4 | 7.5 | 29.9 | 64 |
|   |     |    |     |    | 892 |  | 240 | | | | |

[1] Paraformaldehyde, parts per 100 parts polythiourea.
[2] Kosmobile No. 77, parts per 100 parts polythiourea.

SOLVENT RESISTANCE TESTS

| Sample | Solvent | Percent Weight Increase | Percent Volume Increase |
|---|---|---|---|
| c | Lubricating oil | −2 | −3 |
| c | Water | 12 | 7 |

The data show that this polythiourea when reacted with proper amounts of paraformaldehyde, and compounded with carbon black, produces an excellent rubber. Strength and elongation in general are not as high as that of the material described in Example 1, although in some instances the elongation was higher. Exceptionally high 300% moduli were also obtained at a level of 2.5 parts paraformaldehyde. Sample c shows that a 30-minute cure, while giving slightly poorer properties than a 10-minute under otherwise identical conditions and quantities of materials, did not severely damage the product.

Samples *d* and *e* show the adverse effect of increasing quantities of paraformaldehyde. Use of 3 parts paraformaldehyde in sample *d* resulted in somewhat lower tensile strength and elongations than the material obtained with 2.5 parts paraformaldehyde, but the 4% paraformaldehyde in sample *e* caused a severe decrease in tensile strength and elongation, and a sharp increase in the $T_f$. The products of this example are noteworthy in low temperature properties, as evidenced by the Clash-Berg $T_f$ value. It will be seen that these values are much lower than for the products of Example 1. The solvent resistance of these materials is excellent, as evidenced by the tests made on sample *c*.

EXAMPLE 4

In a manner similar to Example 1, except on a much larger scale in a stirred kettle, 6.0 mols of 1,2-bis(3'-aminopropoxy)ethane was reacted with carbon disulfide in an amount which was 5% in excess of the stoichiometric quantity. The condensation reaction was effected by heating at 160° C. for 18 hours, followed by a gradual increase of the temperature to 190° C. during 4 hours, followed by holding at 190° C. for an additional 2.5 hours. The resulting polythiourea resinous material had a specific viscosity (determined on 1 part by weight polythiourea dissolved in 100 parts by weight dimethylformamide) of 0.330.

The general procedure described in Example 1 was followed in preparing samples for curing, and in testing the cured samples. The data are presented in Table IV.

black employed was "Statex" R, which is a high abrasion furnace black. Stearic acid in the amount of 0.5 p.h.r. was incorporated in all the samples. The trimethylol melamine was ground to a fine powder and incorporated in the gum stock by milling. Particularly noted was the fact that no difficulty in milling was encountered, even though hot mills were used. From this viewpoint, the use of trimethylol melamine as cross-linking agent avoids a pre-curing which often tends to occur on the mills when a more active cross-linking agent, such as paraformaldehyde is used.

The data, obtained on duplicate samples, are reported in Table V.

Table V

| Sample | Statex R, p.h.r. | TMM,[1] p.h.r. | Cure | | Tensile Strength, p.s.i. | | Elong., Percent | Shore A Hardness, 15 sec. |
|---|---|---|---|---|---|---|---|---|
| | | | Min. | ° C. | Break | 300% Modulus | | |
| 1 | 45 | 3.0 | 10 | 175 | 1,805 / 1,900 | 1,165 / 1,330 | 485 / 510 | 70 |
| 2 | 45 | 5.0 | 10 | 175 | 2,260 / 2,420 | 2,120 / 2,110 | 310 / 350 | 77 |
| 3 | 45 | 7.0 | 10 | 175 | 2,360 / 2,330 | ---------- | 250 / 240 | 80 |

[1] TMM = trimethylol melamine.

Examination of Table V reveals that a very satisfactory rubber was prepared. Five percent trimethylol melamine appears to be about optimum with this polythiourea and particular carbon black. It is seen that increasing the trimethylol melamine from 3 to 5 percent gives marked increase in tensile strength, 300% modulus, and Shore hardness, with a considerable decrease, however, in tensile elongation. A further increase, however, to 7 percent trimethylol melamine, gives no appreciable increase in tensile strength but a further marked decrease in tensile elongation as well as increase in hardness.

While the invention has been described with especial reference to various preferred embodiments thereof, it will be appreciated that variations from the details given herein can be effected without departing from the invention in its broadest aspects.

Table IV

| Sample | Curing Agent [1] | Carbon Black | Cure | | Tensile Strength, p.s.i. | | Elong., Percent | Clash-Berg, $T_f$, ° C. | Shore A Hardness, 15 sec. |
|---|---|---|---|---|---|---|---|---|---|
| | | | ° C. | Minutes | Break | 300% Elong. | | | |
| 1 | Paraformaldehyde, 2.0 p.h.r. | Witco 12, 50 p.h.r. | 160 | 15 | 3,420 | 2,710 | 370 | 0 | 65 |
| 2 | Pb₃O₄, 10 p.h.r. | Witco 12, 50 p.h.r. | 165 | 20 | 1,150 | 1,130 | 340 | 0.4 | 73 |

[1] 0.5 p.h.r. stearic acid incorporated in each composition. Witco 12 is an easy processing channel black.

Examination of the data in Table IV shows that the polythiourea cross-linked with paraformaldehyde and reinforced with the carbon black has extremely good rubber properties, including high tensile strength, a high 300% modulus, and a very good elongation of 370%.

The polythiourea cross-linked with 10 parts by weight (per 100 parts polythiourea) of Pb₃O₄ and reinforced with carbon black had properties which in general were considerably poorer than when 2 parts paraformaldehyde was used. However, the lead oxide definitely cross-linked the polythiourea.

EXAMPLE 5

This example gives data on the use of trimethylol melamine as cross-linking agent. The polythiourea gum stock used was a portion of the polythiourea whose preparation is described in Example 4 above, which had a specific viscosity of 0.330. Samples were compounded, cured and tested in the same manner as described above in Example 4 and Example 1. In this instance, the carbon

I claim:

1. A rubbery material having high resistance to the action of organic solvents comprising a cross-linked polythiourea high polymer, said high polymer prior to cross-linking having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

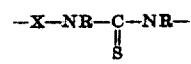

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen.

2. Product according to claim 1 wherein said polythiourea high polymer corresponds to that obtained by reacting carbon disulfide with 1,2-bis(3'-aminopropoxy) ethane.

3. Product according to claim 1 wherein said polythiourea high polymer corresponds to that obtained by reacting carbon disulfide with 2,2'-bis(3'-aminopropoxy) diethyl ether.

4. A rubbery material prepared by reacting (a) a small percentage of trimethylol melamine with (b) a polythiourea high polymer having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

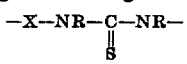

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen.

5. Product according to claim 4 wherein said polythiourea high polymer corresponds to that obtained by reacting carbon disulfide with 1,2-bis(3'-aminopropoxy) ethane.

6. A rubbery material having high resistance to the action of organic solvents comprising a carbon black-reinforced cross-linked polythiourea high polymer, said high polymer prior to cross-linking having a second order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

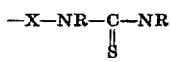

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen.

7. Product according to claim 6 wherein said polythiourea high polymer corresponds to that obtained by reacting carbon disulfide with 1,2-bis(3'-aminopropoxy) ethane.

8. A process which comprises heating an intimate admixture of (a) a small percentage of paraformaldehyde with (b) a polythiourea high polymer having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

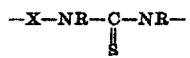

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen, at a temperature within the range of 100 to 200° C. and for a time such as to produce a rubbery material having high resistance to the action of organic solvents.

9. A process according to claim 8, wherein there is also present intimately dispersed in said polythiourea and paraformaldehyde prior to said heating sufficient furnace carbon black to increase the strength of the said rubbery material.

10. A process which comprises heating an intimate admixture of (a) a small percentage of a material liberating formaldehyde on undergoing said heating with (b) a polythiourea high polymer having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

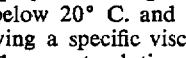

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen, forming a rubbery material having a high resistance to the action of organic solvents.

11. Process according to claim 10 wherein said polythiourea high polymer corresponds to that obtained by reacting carbon disulfide with 1,2-bis(3'-aminopropoxy) ethane.

12. A rubbery material prepared by reacting a polythiourea high polymer having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

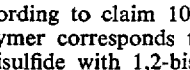

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen, with a quantity of a cross-linking agent effective to convert said polythiourea to a rubbery material having high resistance to the action of organic solvents.

13. A rubbery material prepared by heating an intimate admixture of (a) from 1 to 3 parts by weight paraformaldehyde, (b) from 1 to 50 parts by weight carbon black, and (c) 100 parts by weight of a polythiourea high polymer having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

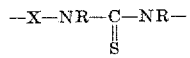

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen, at temperatures and times effective to produce a rubbery material having high resistance to the action of organic solvents and having good strength characteristics.

14. A process which comprises heating an intimate admixture of (a) a small percentage of formaldehyde with (b) a polythiourea high polymer having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

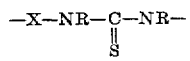

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen, forming a rubbery material having high resistance to the action of organic solvents.

15. A process which comprises heating an intimate admixture of (a) a small percentage of a compound containing reactive methylol groups with (b) a polythiourea high polymer having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

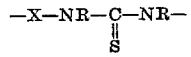

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen, forming a rubbery material having high resistance to the action of organic solvents.

16. A process which comprises heating an intimate admixture of (a) a small percentage of an aliphatic dialdehyde with (b) a polythiourea high polymer having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

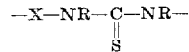

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen, forming a rubbery material having high resistance to the action of organic solvents.

17. A process which comprises heating an intimate admixture of (a) a small percentage of a polyisocyanate with (b) a polythiourea high polymer having a second-order transition temperature below 20° C. and exhibiting cold flow at 20° C. and having a specific viscosity of at least 0.1 as measured on a 1 percent solution thereof in dimethylformamide at 25° C., the polymer chain and the terminal groups thereof having been derived from a polythiourea-forming reaction mixture free from additives that would halt the polymerization reaction before a high molecular weight polymer was obtained, said polymer chain consisting of recurring units having the formula

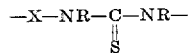

wherein R is selected from the group consisting of hydrogen and monovalent hydrocarbon radicals, and wherein X is a chain of at least 7 atoms the majority of which and the terminal members of which are carbon atoms and which chain contains at least one hetero-atom selected from the group consisting of oxygen, sulfur and nitrogen, forming a rubber material having high resistance to the action of organic solvents.

References Cited in the file of this patent

UNITED STATES PATENTS

| | | |
|---|---|---|
| 2,244,184 | Austin et al. | June 3, 1941 |
| 2,595,400 | Maynard | May 6, 1952 |
| 2,782,089 | Rakowski et al. | Feb. 19, 1957 |

FOREIGN PATENTS

| | | |
|---|---|---|
| 535,139 | Great Britain | Mar. 31, 1941 |
| 574,739 | Great Britain | Jan. 18, 1946 |